Figure 2:
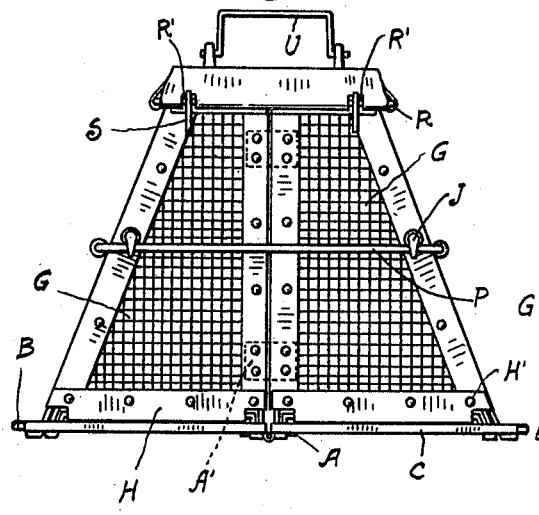

J. GARRARD.
FISH CAGE.
APPLICATION FILED DEC. 23, 1909.
980,148.
Patented Dec. 27, 1910.
3 SHEETS—SHEET 1.
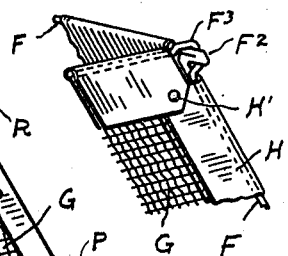
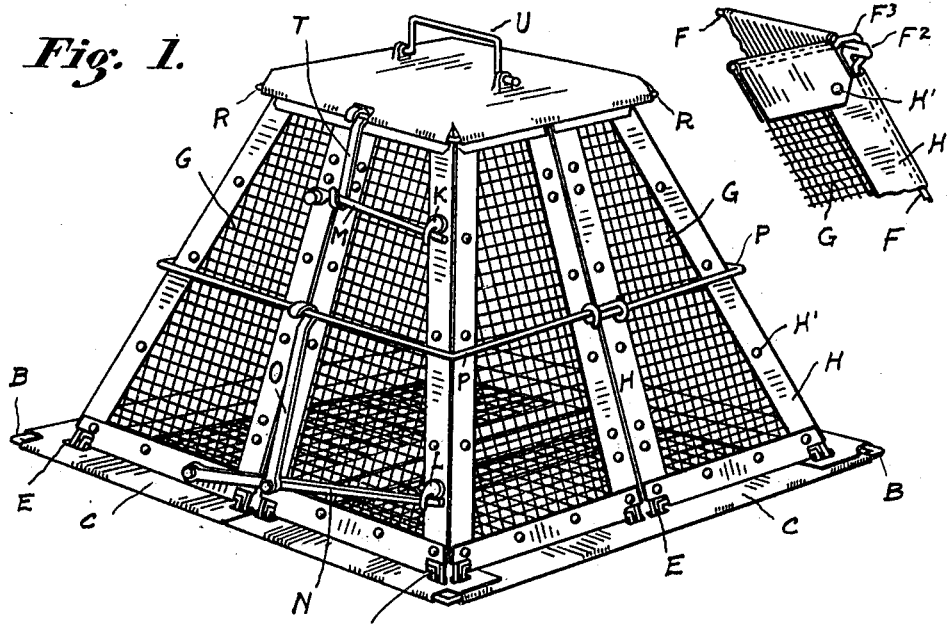
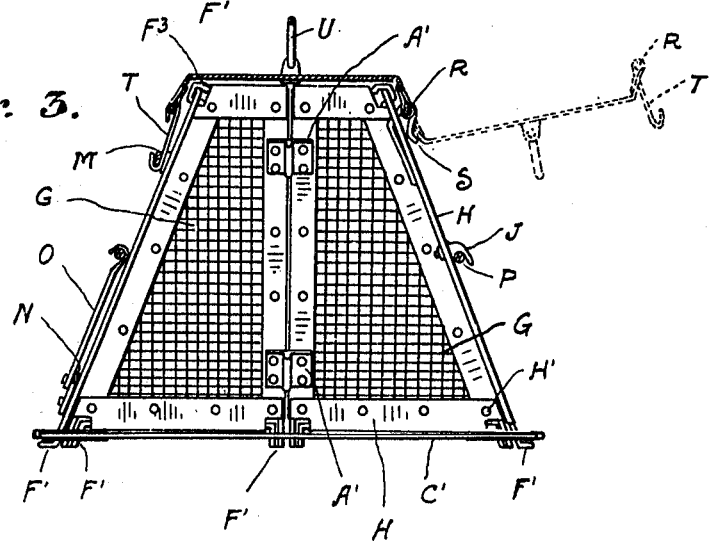
WITNESSES:
INVENTOR
JEREMIAH GARRARD,
BY
ATTORNEY J. GARRARD.
FIsH CAGE.
APPLICATION FILED DEC. 23, 1909.

980,148.

Patented Dec. 27, 1910.
3 SHEETS—SHEET 2.

WITNESSES:
Ruth Higman
George H. Higman

INVENTOR
JEREMIAH GARRARD,
BY
Thomas L. Ryan
ATTORNEY

THE NORRIS PETERS CO., WASHINGTON, D. C.

J. GARRARD.
FIRST CAGE.
APPLICATION FILED DEC. 23, 1909.

980,148.

Patented Dec. 27, 1910.
3 SHEETS—SHEET 3.

WITNESSES:

INVENTOR
JEREMIAH GARRARD,
BY
ATTORNEY

UNITED STATES PATENT OFFICE.

JEREMIAH GARRARD, OF MUNCIE, INDIANA.

FISH-CAGE.

980,148.  Specification of Letters Patent.  Patented Dec. 27, 1910.

Application filed December 23, 1909. Serial No. 534,586.

*To all whom it may concern:*

Be it known that I, JEREMIAH GARRARD, a citizen of the United States, and a resident of the city of Muncie, in the county of Delaware and State of Indiana, have invented a new and useful Fish-Cage; and I declare the following to be a clear and complete specification of my invention.

This invention relates to improvements in fish cages and has for its objects to provide a device of the kind described which may be easily lowered and raised in the water, and which will be capable of being collapsed or taken apart, so as to occupy small space when not in actual use.

More specific objects of my invention are to provide a collapsible cage that will be solid and substantial, easy to manipulate, and which will be durable and not liable to get out of repair.

The objects of my invention are accomplished by the new construction, combination and arrangement of parts described in this specification, defined in the appended claims, and illustrated in the accompanying drawings.

Corresponding parts are designated by similar characters of reference throughout the several views in the drawings, in which—

Figure 5:
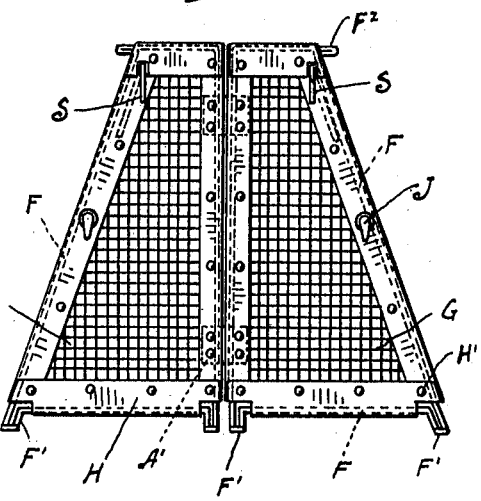
Figure 6:
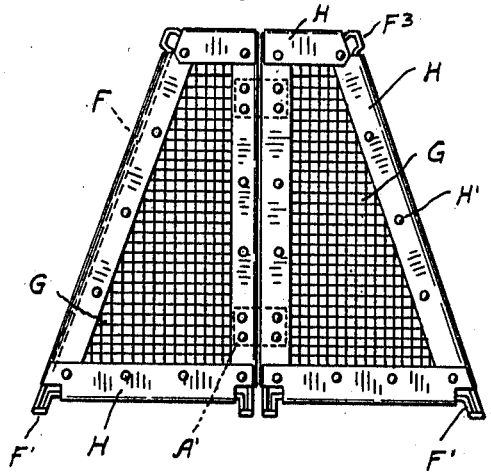
Figure 8:
Figure 9:
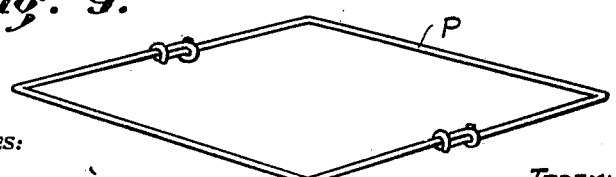
Figure 10:
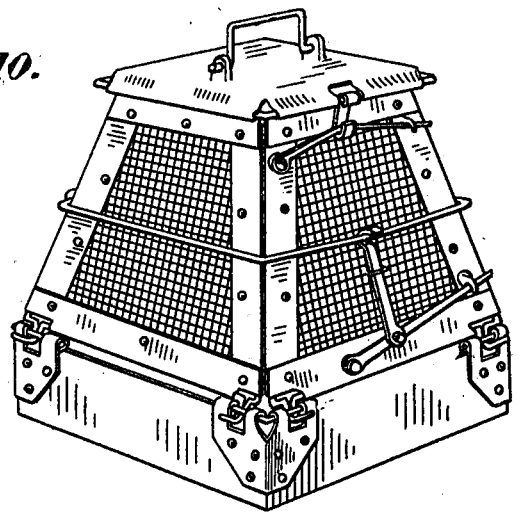
Figure 4:
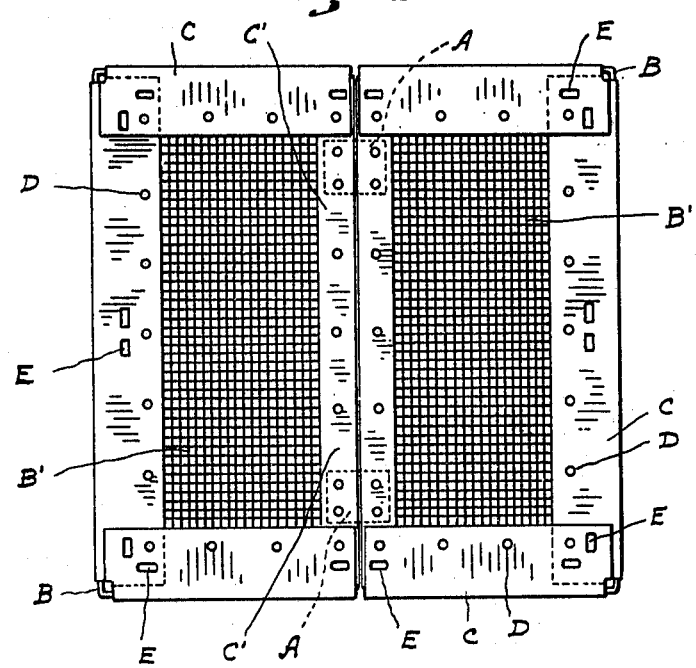

Figure 1 is a perspective view, and Fig. 2 is a rear view of my newly invented fish cage. Fig. 3 is a central transverse sectional view of Fig. 1, showing in dotted lines, the position of the top-section when swung open. Fig. 4 is a plan view of the bottom-section, the body-sections having been detached. Fig. 5 is a view of the rear body-section, and Fig. 6 is a view of one of the side body-sections. Fig. 7 is a detached perspective view showing the hip connection of the body-sections. Fig. 8 is a detached enlarged view of one of the lugs. Fig. 9 is a perspective view of the girdle, removed. Fig. 10 is a modification of my invention.

My improved fish cage consists essentially of a bottom-section, and a plurality of body-sections, all so formed and combined that they may be easily assembled and secured compactly together, and may with equal facility, be disassembled or taken apart.

The preferred form, structure, combination and arrangement of parts for the carrying of my invention into effect is shown in the drawings.

I am aware that minor changes may be made therein, within the scope of my invention as defined by the claims, without departing from the spirit of my invention or sacrificing any of its advantages.

This invention is especially intended for the use of fishermen and its features of utility as a portable cage will be readily understood as the specification of my invention is disclosed. By making the body-sections polygonal in form so that the receptacle is pyramidal, and providing the girdle capable of being locked in the position relative to the body-sections, as shown, a collapsible receptacle is formed which will be at once easy to manipulate and which will be compact and strong and which will be capable of being lowered into and drawn through the water, with maximum ease and facility.

The structure of the bottom-section of my invention is plainly shown in Fig. 4. It is composed of complemental sub-sections joined together by the suitable hinges A whereby the sub-sections may be folded together; this bottom-section will thus be made to occupy greatly reduced space. The frame of each of these sub-sections is composed of the wire B. The wire netting portions $B^1$ are of suitable dimensions to be disposed within the frames, and are held securely by the frame-sides C and $C^1$. Each of these frame sides consists of a thin metal sheet bent upon itself so as to embrace the adjacent portion of the frame wire B; they are closed into a direct and binding contact with the netting and are secured there by the rivets D. Arranged at proper intervals near the outer edges of the bottom-section, are the holes E. The body-sections, substantially triangular in form, and which are adapted to co-engage each other, are provided with feet which will engage the said holes E. Means being provided whereby the body-sections may be pressed into engagement with each other, and the top or cover-section having connections whereby it may be drawn into tight engagement with the body-sections, the cage is very compact and strong, all of the parts or members thereof will mutually coöperate to brace and counter brace each other.

All of the body-sections are constructed in a manner substantially alike. Each is composed of complemental sub-sections joined together by the suitable hinges $A^1$ whereby the subsections are capable of being folded together, and the body-sections thus made to occupy greatly reduced space. The frame of each of the subsections is composed of the wire F so bent at its bottom portion that the feet F¹ are formed. At the upper corners of the frames of the front and rear body-sections are the noses F², and at the upper corners of the frames of the side body-sections, there are provided the eyes F³. The wire nettings G are of suitable dimensions to be disposed within the frames, and are held in position by the frame sides H, four of which frame sides are provided for each sub-section. Each of these frame sides H consists of a thin metal sheet bent upon itself to embrace the adjacent portion of the frame F. They are closed into direct and binding contact with the netting and are secured by the rivets H¹. The rear body section has the lugs J and the front body-section is provided with the lug K and the lug L. These lugs are substantially alike and perform similar functions and the construction of same is shown in Fig. 8. The latch bar M having its one end pivotally fastened to the upper portion of the front body-section, is made of resilient wire and its free end may be moved into and out of engagement with the lug K. The fixed end of the lock bar N is pivotally fastened to the lower portion of the front body-section, and the free end thereof will engage the lug L. The loosely connected link-hook O will engage the girdle P. This girdle P is capable of being collapsed so as to occupy reduced space. As clearly illustrated in Fig. 9 it consists of complemental stout wire half-sections which will slip upon each other in the manner obvious by reference to said Fig. 9.

The top section or cover of my improved fish cage is made of sheet metal its edges being bent or curled about a wire frame R, and which said frame is engaged by the hinge-wires S carried by the rear body-section. The inner ends of these hinge wires are secured to the frame sides preferably by soldering. The said top-section, and the said hinge wires are of such conformation and arrangement that when the top-section is swung open it will be sustained in the dotted line position as shown in Fig. 3. The openings R¹ are of ample size to admit of the easy detachment completely of the top-section, from the hinge wires. The functions of the hook T and the handle U are obvious.

The fish cage constructed in accordance with my invention, it will be seen, is composed of ruggedly constructed sections or parts, capable of being so folded up that when the cage is not in the assembled form for use it will occupy small space and may be easily carried or transported in a trunk, traveling bag or ordinary suit case.

To assemble the parts of my improved fish cage, the bottom-section is first laid flatwise as shown in Fig. 4; the front and rear body-sections are then placed in position the feet F¹ of the same engaging the openings E; then, with placement in position in a similar manner, of the side body-sections the noses F² will engage the eyes F³. The top-sections may then be connected and swung to closed position. The girdle is then placed so that one of its sides will be underneath the lugs J; with the drawing downwardly of the girdle the body-sections will be pressed firmly together, the link hook O is placed in engagement with the girdle and with the engagement by the lock bar N with the lug L, the body sections are locked and will not move apart, nor from the bottom-section, in the least. The latch bar M which will engage the hook T, when placed underneath the lug K will lock the top-section against movement. In disassembling, the disengagement of the latch bar M permits the top-section to be swung open and the same may be easily detached from the hinge-wires S; then with the release of the lock bar N the link-hook O may be disengaged from the girdle. The girdle being removed, the side-body-sections are moved apart at their tops, and then all of the body-sections may be easily taken apart from the bottom-section. The girdle and all of the body-sections may then be collapsed to occupy the minimum space and may be laid flatwise.

In the modified form of embodiment of my invention, as illustrated in Fig. 10, is shown the general form and construction of parts employed for the smaller sized cage, and which might properly be termed a minnow bucket. The general dimensions of this modified form of cage, being much smaller than those of the cage proper, the body-sections are not composed of the hinged sub-sections but are of the homogeneous structure shown. It will be noticed that a solid basin-shaped bottom-section is used; this form of bottom-section has been found desirable for the "minnow bucket" size of cage.

What I claim as my invention, and desire to secure by Letters Patent, is—

1. A device of the kind described, comprising a bottom-section composed of sub-sections hingedly secured together, there being a succession of holes arranged along the outer edges of said bottom-section, body-sections composed of sub-sections hingedly secured together, said body-sections to co-engage each other at their sides and having projections on their bottoms to engage the holes in said bottom-section, a collapsible girdle to encompass the said body sections, connections carried by one of the body-sections to tighten said girdle into contact with the said body-sections.

2. A device of the kind described, comprising a bottom-section composed of subsections hingedly secured together, there being a succession of holes arranged along the outer edges of said bottom-section, polygon-shaped body-sections composed of sub-sections hingedly secured together and having coöperative connections on their sides, and there being projections provided on their bottoms to engage the holes in said bottom-sections, a collapsible girdle to encompass the said body-sections, means carried by the body-sections to tighten the girdle into contact with the body-sections, a top-section detachably connected to one of the said body-sections, means to lock the top-section into engagement with the body-sections, substantially as described.

3. A device of the kind described, comprising a bottom section, similar polygon shaped body-sections having their bases to engage the said bottom section, a girdle to encompass the body-sections, means carried by one of the body-sections to engage the said girdle, means carried by one of the other body-sections to draw and to hold the girdle into tightened engagement with the body-sections, a top-section having connection with the upper edge of one of the body-sections, means carried by one of the body-sections to draw and to hold the top-section into tightened engagement with the body-sections.

4. A device of the kind described comprising a bottom section, polygon shaped body-sections having their bases to engage the said bottom-section, a girdle to encompass the body-sections, a lever fulcrumed on one of the body-sections there being a lug carried by the latter to be engaged by the free end of the said lever, a link carried by the lever to detachably engage the said girdle.

5. A device of the kind described comprising a bottom section, similar polygon-shaped body-sections having their bases to detachably engage said bottom section, a collapsible girdle to encompass the body-sections, connections carried by one of the body-sections to tighten the said girdle into contact with the said body-sections.

In testimony whereof, I, the said JEREMIAH GARRARD, have subscribed my name to this specification, in the presence of two subscribing witnesses.

JEREMIAH GARRARD.

Witnesses:
ADDISON E. HOPPES,
THOMAS L. RYAN.